United States Patent
Hermann et al.

(12) 
(10) Patent No.: US 6,811,667 B2
(45) Date of Patent: Nov. 2, 2004

(54) CATHODIC ELECTRODEPOSITION COATING AGENTS CONTAINING BISMUTH COMPLEXES, PREPARATION AND USE THEREOF

(75) Inventors: Ulrich Hermann, Graz (AT); Walter Kuehhirt, Remscheid (DE); Rudolf Schipfer, Graz (AT)

(73) Assignee: E. I. du Pont de Nemours and Company, Wilmington, DE (US)

( * ) Notice: Subject to any disclaimer, the term of this patent is extended or adjusted under 35 U.S.C. 154(b) by 415 days.

(21) Appl. No.: 10/090,654

(22) Filed: Mar. 4, 2002

(65) Prior Publication Data

US 2003/0164299 A1 Sep. 4, 2003

(51) Int. Cl.[7] .............................................. C25D 13/10
(52) U.S. Cl. ........................ 204/489; 204/499; 528/48
(58) Field of Search ................................ 204/489, 499; 528/48

(56) References Cited

U.S. PATENT DOCUMENTS

| | | |
|---|---|---|
| 5,554,700 A | 9/1996 | Schipfer et al. |
| 5,702,581 A | 12/1997 | Kerlin et al. |
| 5,908,912 A | 6/1999 | Kollah et al. |
| 5,936,013 A | 8/1999 | Feola et al. |
| 5,972,189 A | 10/1999 | McMurdie et al. |
| 6,174,422 B1 | 1/2001 | Hönig et al. |
| 6,265,079 B1 | 7/2001 | Nishiguchi et al. |

FOREIGN PATENT DOCUMENTS

| | | |
|---|---|---|
| DE | 4434593 A1 | 4/1996 |
| EP | 1041125 A1 | 10/2000 |
| WO | WO 9610057 A1 | 4/1996 |
| WO | WO 0047642 A1 | 8/2000 |
| WO | WO 0050522 A1 | 8/2000 |
| WO | WO 0151570 A1 | 7/2001 |

Primary Examiner—Kishor Mayekar
(74) Attorney, Agent, or Firm—Steven C. Benjamin

(57) ABSTRACT

Waterborne CED coating agents containing resin solids and optionally pigments, fillers and/or conventional coating additives, wherein said CED coating agents contain at least one bismuth complex with ligands selected from the group consisting of hydroxyquinolines, 1,2-dioximes, 1,3-dioximes, and N,N'-diarylthiocarbazides and combinations thereof in an amount of 0.1 wt. % to 2.5 wt. %, calculated as bismuth and based on the resin solids.

11 Claims, No Drawings

CATHODIC ELECTRODEPOSITION COATING AGENTS CONTAINING BISMUTH COMPLEXES, PREPARATION AND USE THEREOF

FIELD OF THE INVENTION

The invention relates to cathodic electrodeposition (CED) coating agents containing bismuth complexes, the preparation and use thereof in processes for coating electrically conductive substrates by CED coating.

BACKGROUND OF THE INVENTION

The use of various bismuth salts as a constituent in lead-free CED coating agents is described repeatedly in the patent literature, for example, in U.S. Pat. Nos. 5,936,013, 5,702,581, 5,554,700, 5,908,912, 6,174,422, 5,670,441, WO 96/10057, U.S. Pat. No. 5,972,189, WO 00/50522, U.S. Pat. No. 6,265,079, EP 1 041 125, WO 00/47642, WO 01/51570. DE-A 44 34 593 and U.S. Pat. No. 5,702,581 also mention the possibility of using bismuth complexes, for example, bismuth-acetylacetone chelates as a constituent in CED coating agents, but emphasize at the same time that the use of bismuth salts of organic monocarboxylic acids is preferred and the use of bismuth salts of hydroxycarboxylic acids is particularly preferred.

As a rule, metal substrates to be coated with CED coating agents with a view to obtaining a conversion layer on the metal surface undergo a pretreatment including a phosphating treatment and optionally, a passivating treatment. In the case of substrates with a complicated three-dimensional geometry, particularly substrates with hollow spaces and/or undercuts such as, automotive bodies or automotive body parts, carry-over of pretreatment materials and hence of troublesome ions such as, in particular, phosphate ions, into the CED coating bath may take place, for example, if the rinsing operations forming the conclusion of the pretreatment are not carried out perfectly and with the necessary effectiveness. Troublesome ions of this kind may adversely affect the effectiveness of bismuth in the bismuth-containing CED coating agents known from the prior art. Adverse consequences include, for example, declining catalytic effect with regard to baking-cross-linking of the CED coating layers, and impaired anti-corrosive effect of the baked CED coating layers.

The object of the invention is to provide bismuth-catalyzed CED coating agents with resistance or at least increased resistance to troublesome ions of the kind which occur, in particular, in pretreatment materials used to produce conversion layers on metal substrates, for example, anions such as phosphate, hydrogen phosphate, dihydrogen phosphate, di- and triphosphate or oligomeric phosphates.

SUMMARY OF THE INVENTION

It has become apparent that this object may be achieved with waterborne CED coating agents which contain resin solids and optionally pigments, fillers and/or conventional coating additives and contain at least one bismuth complex with ligands selected from the group consisting of hydroxyquinolines, 1,2-dioximes, 1,3-dioximes and N,N'-diarylthiocarbazides and combinations of said ligands (hereinafter also called "bismuth complex as defined" for short, or simply "bismuth complex") in an amount of 0.1 wt. % to 2.5 wt. %, calculated as bismuth and based on the resin solids.

DETAILED DESCRIPTION OF THE EMBODIMENTS

The CED coating agents are more resistant to contamination with pretreatment materials such as ions carried over therewith, in particular, phosphate, if they contain the bismuth complexes as defined instead of simple bismuth salts or bismuth-acetylacetone complexes.

The CED coating agents according to the invention are inherently known waterborne electrodeposition coating agents depositable on the cathode. They contain at least one bismuth complex as defined, for example, as cross-linking catalyst to replace lead catalysts.

The CED coating agents are waterborne coating agents having a solids content of, for example, 10 wt. % to 30 wt. %. The solids are composed of the resin solids, the bismuth complex(es), optionally present pigments, fillers and/or further non-volatile additives and are preferably free from lead compounds. The resin solids are composed of conventional self- or externally cross-linking CED binder(s) carrying cationic substituents or substituents which can be converted to cationic groups, optionally present cross-linking agent(s) and optionally other resin(s) contained in the CED coating agent such as, paste resin(s). The cationic groups may be cationic groups or basic groups which can be converted to cationic groups, e.g., amino, ammonium, e.g., quaternary ammonium, phosphonium and/or sulfonium groups. Binders having basic groups are preferred. Nitrogen-containing basic groups such as amino groups are particularly preferred. These groups may be present in the quaternized form or they are converted to cationic groups with a conventional neutralizing agent such as amidosulfuric acid or methanesulfonic acid, lactic acid, formic acid, acetic acid.

The cationic or basic binders may be resins containing, for example, primary, secondary and/or tertiary amino groups, the amine values of which are, e.g., 20 to 250 mg KOH/g. The weight-average molecular mass (Mw) of the CED binders is preferably 300 to 10,000. The CED binders are not subject to any restriction. The various CED binders or CED binder/cross-linking agent combinations known, for example, from the extensive patent literature may be used. Examples of such CED binders include amino(meth)acrylate resins, amino epoxy resins, amino epoxy resins with terminal double bonds, amino epoxy resins with primary OH groups, amino polyurethane resins, amino group-containing polybutadiene resins or modified epoxy resin/carbon dioxide/amine reaction products. These binders may be self-cross-linking or they may be used in combination with cross-linking agents known to the skilled person. Examples of such cross-linking agents include aminoplast resins, blocked polyisocyanates, cross-linking agents with terminal double bonds, polyepoxide compounds, cross-linking agents with cyclic carbonate groups or cross-linking agents that contain groups capable of transesterification and/or transamidization.

The CED binders may be converted to CED binder dispersions and used as such for the preparation of CED coating agents. The preparation of CED binder dispersions is known to the skilled person. For example, CED binder dispersions may be prepared by converting CED binders to an aqueous dispersion by neutralization with acid and dilution with water. The CED binders may also be present in mixture with cross-linking agents and converted together with these to an aqueous CED binder dispersion. If present, organic solvent(s) may be removed to the desired content before or after conversion to the aqueous dispersion, for example, by vacuum distillation.

In addition to the binder(s) and optionally present cross-linking agent, water and the at least one bismuth complex, the CED coating agents may also contain pigments, fillers, organic solvents and/or conventional coating additives.

Examples of pigments and fillers include the conventional inorganic and/or organic colored pigments and/or special-effect pigments and/or fillers such as, e.g., titanium dioxide, iron oxide pigments, carbon black, phthalocyanine pigments, quinacridone pigments, metallic pigments, interference pigments, kaolin, talc, silica. The pigment plus filler/resin solids weight ratio of the CED coating agents is, for example, from 0:1 to 0.8:1, and for pigmented coating agents it is preferably from 0.05:1 to 0.4:1.

Examples of organic solvents which may be contained in quantity proportions of, for example, up to 5 wt. % in the CED coating bath capable of coating include polar aprotic water-miscible solvents such as N-methylpyrrolidone, dimethyl sulfoxide, dimethyl formamide, sulfolane; alcohols such as, cyclohexanol, 2-ethylhexanol, butanol; glycol ethers such as, methoxypropanol, ethoxypropanol, butoxyethanol, diethylene glycol diethyl ether; ketones such as, methyl isobutyl ketone, methyl ethyl ketone, cyclohexanone; hydrocarbons.

Examples of conventional coating additives which may be contained in the CED coating agents in quantity proportions of, for example, 0.1 wt. % to 5 wt. %, based on the resin solids, include wetting agents, neutralizing agents, anti-crater agents, leveling agents, antifoaming agents, light stabilizers and antioxidants.

The CED coating agents according to the invention, in particular, do not contain simple bismuth salts or bismuth-acetylacetonate complexes, but contain at least one bismuth complex with ligands selected from the group consisting of hydroxyquinolines, 1,2-dioximes, 1,3-dioximes and N,N'-diarylthiocarbazides and combinations thereof. Examples of hydroxyquinolines include 2-, 7-and particularly 8-hydroxyquinolines which—albeit less preferred—may have one or more other substituents. 8-Hydroxyquinoline is particularly preferred. 1,2-dioximes and 1,3-dioximes are reaction products of 1 mole of corresponding 1,2- or 1,3-dicarbonyl compounds, particularly of corresponding diketones with 2 mole of hydroxylamine; diacetyl dioxime is preferred. N,N'-diarylthiocarbazides are reaction products of 1 mole of thiophosgene with 2 mole of aryl hydrazine; N,N'-diphenylthiocarbazide is preferred. The bismuth complexes may contain one or more types of the ligands described above.

The quantity proportion of the at least one bismuth complex in the CED coating agent is 0.1 wt. % to 2.5 wt. %, preferably 0.5 wt. % to 2 wt. %, calculated as bismuth and based on the resin solids of the CED coating agent. The at least one bismuth complex may be present in the disperse phase of the CED coating agent in dissolved or in finely dispersed form.

The bismuth complexes may be prepared by reaction of, for example, 1 mole to 6 mole, preferably more than 2 mole, particularly 3 mole to 6 mole of one or more ligands with 1 mole of bismuth in the form of suitable bismuth compounds in bulk, in an aqueous or organic medium, for example, in solution or in suspension at temperatures which depend, for example, on the reaction medium in question, from 20° C. to 250° C. Examples of bismuth compounds suitable as starting compounds include bismuth oxide, hydroxide or inorganic bismuth salts, such as bismuth carbonate, nitrate, sulfate, amidosulfate or organic bismuth salts, such as bismuth lactate, dimethylolpropionate, methane sulfonate, ethyl hexanoate. Polar, particularly polar aprotic solvents are the preferred reaction medium. After the reaction has ended, the bismuth complexes may be isolated and used in the preparation of the CED coating agents according to the invention, or they may be used without isolation and purification in mixture with other constituents of the reaction medium.

The bismuth complexes may, for example, precipitate and be isolated as a precipitate. The precipitate may be washed and then dissolved or finely dispersed in organic solvent, particularly in polar and preferably aprotic solvents, such as N-methylpyrrolidone, dimethyl sulfoxide, dimethyl formamide, sulfolane.

During the preparation of bismuth complexes in organic solvent, particularly in polar and preferably aprotic solvents, the bismuth complexes may also be obtained directly as organic solution or in finely dispersed form.

In order to prepare the CED coating agents, the at least one bismuth complex is mixed with the other constituents of the CED coating agent. The at least one bismuth complex may be used in various preparation forms, for example, as such or as an aqueous or organic preparation, for example, as a solution, emulsion or suspension. The use as organic solution or suspension is preferred, particularly in aprotic, polar water-miscible solvents where the concentration of bismuth complex within such an organic solution or suspension may correspond to a content of, for example, 1 wt. % to 50 wt. % of bismuth. The organic solvent reaching the CED coating agent by way of such an organic solution or suspension may be removed in the usual way, for example, by ultrafiltration, to the desired content.

The incorporation of the at least one bismuth complex in the CED coating agent may take place in various ways. For example, the bismuth complexes may be added to an optionally already neutralized CED binder or to an optionally already neutralized CED binder solution before the addition of substantial amounts of water, and then homogenized with stirring. The bismuth complexes may also, however, be added to a finished aqueous CED binder dispersion or to a finished CED coating agent capable of coating.

Whether the CED coating agents are pigmented or unpigmented, they may be prepared by known methods for the preparation of CED coating baths, i.e., in principle both by means of the one-component and the two-component procedure.

In the case of the one-component procedure for the preparation of pigmented CED coating agents, one-component concentrates are prepared by dispersing and optionally grinding pigments and/or fillers in CED binder, for example, in an organic solution of a CED binder or of a paste resin, optionally followed by the addition of further make-up CED binder to the mill base. The CED coating agent or bath may then be prepared from this material by dilution with water after the addition of acid as neutralizing agent—unless this has already been carried out. In the case of solids compensation, unlike the fresh preparation of a CED coating bath, mixing is carried out not with water but with CED coating bath contents depleted of solids due to CED coating. The addition of the at least one bismuth complex may take place by all the methods of addition described above in any one of the forms of preparation described above. An organic solution of the at least one bismuth complex is preferably added to the mill base before or after dispersion and/or to the CED binder added for make-up purposes before dilution with water.

Unpigmented CED coating agents may be prepared in a similar manner by the one-component procedure in which case the addition and dispersion of pigments or fillers is, by definition, left out.

In the two-component procedure for the preparation of pigmented or unpigmented CED coating agents, (a) at least one CED binder dispersion is mixed as one component with (b) at least one additional, optionally pigmented (optionally containing pigments and/or fillers) component to obtain a CED coating agent, with the additional possibility of adding water to adjust the solids. A pigmented component (b) is, in particular, a pigment and/or filler paste (b1). Pigment and/or filler pastes (b1) may be prepared in the usual manner by dispersing and optionally grinding pigments and/or fillers in CED binders, preferably in conventional paste resins known to the skilled person. Examples of unpigmented components (b) include additive preparations (b2), for example, aqueous or organic solutions, aqueous emulsions or aqueous or organic suspensions of additives. The at least one bismuth complex may be a constituent of the CED binder dispersion (a) and/or of a pigment and/or filler paste (b1) and/or of an additive preparation (b2). In order to prepare a CED binder dispersion (a) containing the at least one bismuth complex, the at least one bismuth complex may be added, for example, to a CED binder present in the non-aqueous phase and converted together with this—after the addition of acid as neutralizing agent provided this has not already been carried out—to a corresponding CED binder dispersion (a) by dilution with water. A pigment or filler paste (b1) containing at least one bismuth complex may be prepared, for example, by dispersing and optionally grinding pigments and/or fillers and the at least one bismuth complex in CED binder or paste resin or by mixing CED binder containing at least one bismuth complex and/or cross-linking agent with a pigment paste prepared beforehand. The additive preparations (b2), which may contain at least one bismuth complex as the sole additive or as one of several additives, may be corresponding aqueous or organic preparations, for example, emulsions, suspensions or solutions.

In the case of solids compensation, unlike the fresh preparation of a CED coating bath, the components (a) and (b) are not diluted with water but mixed with CED coating bath contents depleted in solids due to CED coating.

CED coating layers, for example in a dry layer thickness of 10 $\mu$m to 30 $\mu$m, may be deposited in the usual way from the CED coating agents onto electrically conductive, particularly metallic substrates connected up as the cathode.

Metal substrates used may be parts made of all conventional metals, for example, the metal parts usually used in the automotive industry, particularly automotive bodies and parts thereof. Examples include components of aluminum, magnesium or alloys thereof and, in particular, galvanized or non-galvanized steel. Before CED coating, the metal substrates may undergo a conversion treatment, for example, they may be, in particular, phosphated and optionally passivated.

Corrosion protection of primers deposited on, for example steel, from the CED coating agents according to the invention is also outstanding on bright steel or on merely phosphated non-passivated steel. The various substrates may be present together on one workpiece (mixed construction). Similarly, metal parts which have already been partially or wholly pre-coated, or plastic parts, may be present on the workpiece.

After coating with the CED coating agent according to the invention, the electrodeposition coating is cross-linked by baking, e.g., at object temperatures from 130° C. to 200° C. The CED coating layers may be unbaked or, after baking, provided with one or more further coating layers, for example, a top coat layer or a multi-layer coating comprising, for example, a surfacer layer, base coat layer and clear coat layer.

Particularly in the case of CED coating of conversion-pretreated metal substrates, the CED coating agents according to the invention may provide proof of their strength, namely little susceptibility to or resistance to contamination with pretreatment materials, in particular ions carried over from pretreatment materials. Contamination of the CED coating agent according to the invention with 20 ppm to 300 ppm of phosphate leads, for example, to little or no reduction in the catalytic effect with regard to baking-cross-linking of coating layers electrodeposited from the CED coating agents and in the anticorrosive effect of the baked CED coating layers.

EXAMPLES

Example 1

Preparation of a Bismuth-Acetylacetonate Complex 20.4 g of acetylacetone were added to 111 g of a 29.2 wt. % aqueous solution of bismuth lactate (bismuth content 12.8 wt. %) and boiled under reflux for 2 hours. A yellow solution was obtained.

Example 2

Preparation of a Bismuth Complex with 8-hydroxyquinoline

A mixture of 111 g of bismuth oxide, 208 g of 8-hydroxyquinoline and 50 g of N-methylpyrrolidone was boiled under reflux for 30 minutes. A green-brown solution was obtained.

Example 3

Preparation of a Bismuth Complex with Diacetyl Dioxime 111 g of a 29.2 wt. % aqueous solution of bismuth lactate (bismuth content 12.8 wt. %) were added to a mixture of 51 g of diacetyl dioxime and 1000 g of water and 5 g of sodium chloride as catalyst, and stirred for 60 minutes at 50° C. The pH was adjusted to 8 with ammonia. The precipitate formed was separated, washed with water and dried. 95 g of the dried precipitate were dissolved in 50 g of N-methylpyrrolidone whilst boiling under reflux. A brown solution was obtained.

Example 4

Preparation of a Bismuth Complex with N,N'-diphenylthiocarbazide

A mixture of 111 g of bismuth oxide, 120 g of diphenylthiocarbazone and 500 g of N-methylpyrrolidone was boiled for 30 minutes under reflux. A red-brown solution was obtained.

Examples 5 d1)–d5)

Preparation of CED Coating Dispersions a) 832 parts of the monocarbonate of an epoxy resin based on bisphenol A (commercial product Epikote® 828) were mixed with 830 parts of a commercial polycaprolactone polyol (commercial product CAPA 205) and 712 parts of diglycol dimethylether and reacted at 70° C. to 140° C. with 0.3% $BF_3$-etherate as catalyst until an epoxy value of 0 was obtained. In the presence of 0.3% Zn acetyl acetonate as catalyst, 307 parts of a reaction product of 174 parts of toluene diisocyanate and 137 parts of 2-ethyl hexanol were added to this product at 40° C. to 80° C. with the addition of 0.3% benzyl trimethylammonium hydroxide. The reaction was continued until an NCO value of about 0 was obtained and the mixture then adjusted to a solids content of 70 wt. % with diglycol dimethyl ether.

b) 618 parts of a reaction product of 348 parts of toluene diisocyanate and 274 parts of 2-ethyl hexanol were added slowly to 1759 parts of a biscarbonate of an epoxy resin based on bisphenol A (commercial product Epikote® 1001) at 60° C. to 80° C. with the addition of 0.3% benzyl trimethylammonium hydroxide. The reaction was continued to an NCO value of about 0.

c) At a temperature of 20° C. to 40° C., 622 parts of the reaction product of 137 parts of 2-ethylhexanol with 174 parts of toluene diisocyanate with benzyltrimethylammonium hydroxide catalysis (0.3%) were added to 860 parts of bishexamethylene triamine dissolved in 2315 parts of methoxy propanol and the reaction was continued until an NCO content of about 0 was obtained. Then 4737 parts of the reaction product b) and 3246 parts of the reaction product a) (in each case 70% in diglycol dimethyl ether) were added and reacted at 60° C. to 90° C. The reaction was ended at an amine value of about 32 mg KOH/g. The product obtained was distilled under vacuum to a solids content of about 85%.

d1) Neutralization was carried out with 30 mmole of formic acid/100 g of resin. The mixture was then heated to 70° C. and bismuth lactate was added in portions, with stirring, over a period of two hours, in an amount such that 1.5 wt. % of bismuth, based on solids content, was present in the mix. Stirring was then continued for another 6 hours at 60° C. to 70° C. After cooling, the mixture was converted with deionized water to a dispersion with a solids content of 40 wt. %.

d2–d5) Operations were carried out as described under d1) except that in each case a hot, 80° C. solution of the relevant bismuth complex from Examples 1 to 4 was used instead of bismuth lactate.

Examples 6a–e

Preparation of Bismuth-Containing Comparative CED Clear Coating Baths 6a, b and Bismuth-Containing CED Clear Coating Baths According to the Invention 6c–e The dispersions from Examples 5 d1)–d5) were diluted with deionized water to a solids content of 15 wt. %.

Examples 7a–e

Simulation of Phosphate Contamination by Adding 150 ppm of Phosphate to CED Coating Baths 6a–e CED coating baths 7a–e in each case containing 150 ppm of phosphate were prepared from the CED coating baths 6a–e, in each case by adding the appropriate amount of 1% phosphoric acid.

Examples 8a–e

Simulation of Phosphate Contamination by Adding 150 ppm of Phosphate to CED Coating Baths 7a–e CED coating baths 7a–e in each case containing 300 ppm of phosphate were prepared from the CED coating baths 7a–e containing 150 ppm of phosphate, in each case by adding the appropriate amount of 1% phosphoric acid.

In each case non-pretreated steel test panels were coated in a dry layer thickness of 20 $\mu$m from the CED coating baths 6a–e, 7a–e and 8a–e and, after rinsing with deionized water, baked for 20 minutes at various baking temperatures (140, 150, 160 and 170° C. object temperature).

The baked CED coating layers were tested for completeness of cross-linking (a) by testing the acetone resistance and (b) by testing the behavior towards mechanical stress.

a) Acetone Resistance:

To this end, a wad of cotton wool impregnated with acetone was placed on the baked CED coating layer and covered with a watchglass. After leaving the CED coating layer covered with the watchglass for 2 minutes, the watchglass and wad of cotton wool were removed and, after 30 seconds (to allow for evaporation of acetone residues), tested for softening (nok: unsatisfactory) and lack of change (ok: satisfactory) by scratching with a horn spatula.

b) Testing by Mechanical Stress:

To this end a Reverse-Impact-Test (cf. ASTM D 2794, use of an indenter with a ⅝" hemispherical head, denting of the underside) was carried out. The test was performed in the range of a 20 to 80 inch-pound load. The assessment of the CED coating layer was made on the dented frontside by visual examination of spalling, cracks or microcracks. If such features occurred below a load of 50 inch-pound, the result was deemed to be nok, and if above 50 inch-pound, the result was deemed to be ok.

Moreover, the baked CED coating layers were tested to assess their anticorrosive effect. To this end, creep corrosion at the cut (in mm, on one side) was determined after a salt spray test lasting 240 hours (in accordance with DIN 50 021-SS in conjunction with DIN 53 167).

The results are summarized in the Table below.

| CED Coating Bath | Acetone resistance after baking at ° C. | | | | Reverse-Impact-Test after baking at ° C. | | | | Creep corrosion at the cut (on one side, in mm) after baking at ° C. | | | |
|---|---|---|---|---|---|---|---|---|---|---|---|---|
| | 140 | 150 | 160 | 170 | 140 | 150 | 160 | 170 | 140 | 150 | 160 | 170 |
| 6a | nok | ok | ok | ok | nok | ok | ok | ok | 3.5 | 2.5 | 1.5 | 1.5 |
| 6b | nok | ok | ok | ok | nok | nok | nok | ok | 3.0 | 2.5 | 2.0 | 1.5 |
| 6c | nok | ok | ok | ok | nok | ok | ok | ok | 3.5 | 2.5 | 2.0 | 1.5 |
| 6d | nok | nok | ok | ok | nok | nok | ok | ok | 3.0 | 3.0 | 1.5 | 1.5 |

-continued

| CED Coating | Acetone resistance after baking at ° C. | | | | Reverse-Impact- Test after baking at ° C. | | | | Creep corrosion at the cut (on one side, in mm) after baking at ° C. | | | |
|---|---|---|---|---|---|---|---|---|---|---|---|---|
| Bath | 140 | 150 | 160 | 170 | 140 | 150 | 160 | 170 | 140 | 150 | 160 | 170 |
| 6e | nok | ok | ok | ok | nok | nok | ok | ok | 3.5 | 2.5 | 2.0 | 1.5 |
| 7a | nok | nok | nok | ok | nok | nok | nok | nok | 5.5 | 5.0 | 3.5 | 3.0 |
| 7b | nok | nok | nok | ok | nok | nok | nok | ok | 4.5 | 4.5 | 4.0 | 4.0 |
| 7c | nok | ok | ok | ok | nok | ok | ok | ok | 3.5 | 2.5 | 2.0 | 2.0 |
| 7d | nok | nok | ok | ok | nok | nok | ok | ok | 3.5 | 3.0 | 2.0 | 2.0 |
| 7e | nok | ok | ok | ok | nok | nok | ok | ok | 3.5 | 2.5 | 2.0 | 2.0 |
| 8a | nok | nok | nok | nok | nok | nok | nok | nok | 6.5 | 6.0 | 5.0 | 5.0 |
| 8b | nok | nok | nok | nok | nok | nok | nok | nok | 6.0 | 5.5 | 5.5 | 5.0 |
| 8c | nok | ok | ok | ok | nok | ok | ok | ok | 4.0 | 3.5 | 2.0 | 2.0 |
| 8d | nok | nok | ok | ok | nok | nok | ok | ok | 4.0 | 4.0 | 2.5 | 2.5 |
| 8e | nok | nok | ok | ok | nok | nok | ok | ok | 4.5 | 3.5 | 2.5 | 2.5 |

Non-contaminated (phosphate-free) comparative CED coating baths 6a containing bismuth lactate, 6b containing a bismuth acetylacetonate complex and 6c–6e (according to the invention, containing a bismuth complex with 8-hydroxyquinoline, diacetyl dioxime or N,N'-diphenylthiocarbazide) showed good results, if the baking temperature exceeded 140 or 150° C. CED coating baths 6a–6e that in each case were contaminated with 150 ppm phosphate formed CED coating baths 7a–7e. CED coating baths 7a and 7b suffered worse results in comparison with CED coating baths 7c–7e that were only slightly negatively affected. CED coating baths 8a–8e were contaminated with an additional amount of 150 ppm phosphate yielded (in each case the total contamination was with 300 ppm phosphate). The same tendency in susceptibility to phosphate contamination was shown as in case of CED coating baths 7a–7e but were even more noticeable: Unacceptable results were obtained from CED coating baths 8a and 8b but the results of CED coating baths 8c–8e were still acceptable if the baking temperature was at least 160 or 170° C.

What is claimed is:

1. Waterborne cathodic electrodeposition (CED) coating agents comprising resin solids and optionally pigments, fillers and conventional coating additives, wherein said CED coating agents comprise at least one bismuth complex with ligands selected from the group consisting of hydroxyquinolines, 1,2-dioximes, 1,3-dioximes, and N,N'-diarylthiocarbazides and combinations thereof in an amount of 0.1 wt. % to 2.5 wt. %, calculated as bismuth and based on the resin solids.

2. The CED coating agents of claim 1, wherein the ligands are selected from the group consisting of 8-hydroxyquinoline, diacetyl dioxime, N,N'-diphenylthiocarbazide and combinations thereof.

3. The CED coating agents of claim 1, wherein the quantity proportion of the at least one bismuth complex is 0.5 wt. % to 2 wt. %, calculated as bismuth and based on the resin solids of the CED coating agent.

4. The CED coating agents of claim 1, wherein the resin solids comprise a cationic resin having a weight average molecular mass (MW) of 300 to 10,000 and an amine value of 20 to 250 mg KOH/g.

5. The CED coating agents of claim 1, wherein the CED coating agent is contaminated with pretreatment material.

6. The CED coating agents of claim 1, wherein the CED coating agent is contaminated with 20 ppm to 300 ppm of phosphate.

7. A process for cathodically electrocoating electrically conductive substrates which comprise the steps of immersing the substrates in a bath of the waterborne cathodic electrodeposition (CED) coating agent of claim 1 and cathodically electrodepositing a film on the substrates.

8. The process of claim 7, wherein the substrates are metal substrates.

9. The process of claim 8, wherein the metal substrates are metal substrates which have undergone a conversion pretreatment.

10. The process of claim 9, wherein the conversion pretreatment is a conversion pretreatment including phosphating and optionally passivating.

11. The process of claim 7, wherein the substrates are substrates selected from the group consisting of automotive bodies and body parts.

* * * * *

UNITED STATES PATENT AND TRADEMARK OFFICE
CERTIFICATE OF CORRECTION

PATENT NO. : 6,811,667 B2
DATED : November 2, 2004
INVENTOR(S) : Ulrich Hermann et al.

It is certified that error appears in the above-identified patent and that said Letters Patent is hereby corrected as shown below:

Column 8,
Line 15, "7a-e in each" to be replaced with -- 8a-e in each --

Signed and Sealed this

Fifth Day of April, 2005

JON W. DUDAS
*Director of the United States Patent and Trademark Office*